Sept. 27, 1927.
E. J. G. PHILLIPS
1,643,642
TRAVELING CRANE
Filed Feb. 7, 1925     3 Sheets-Sheet 1
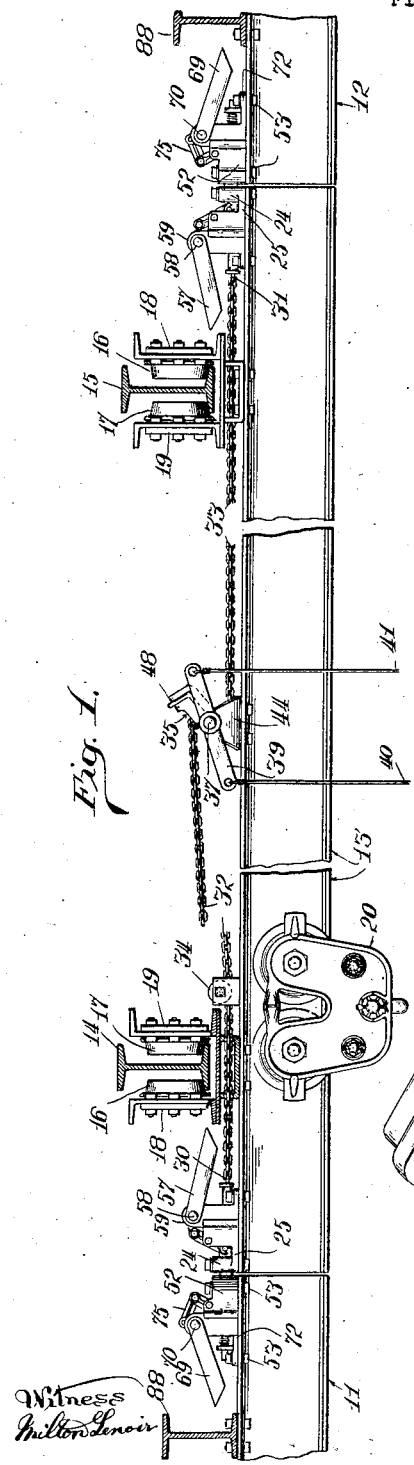
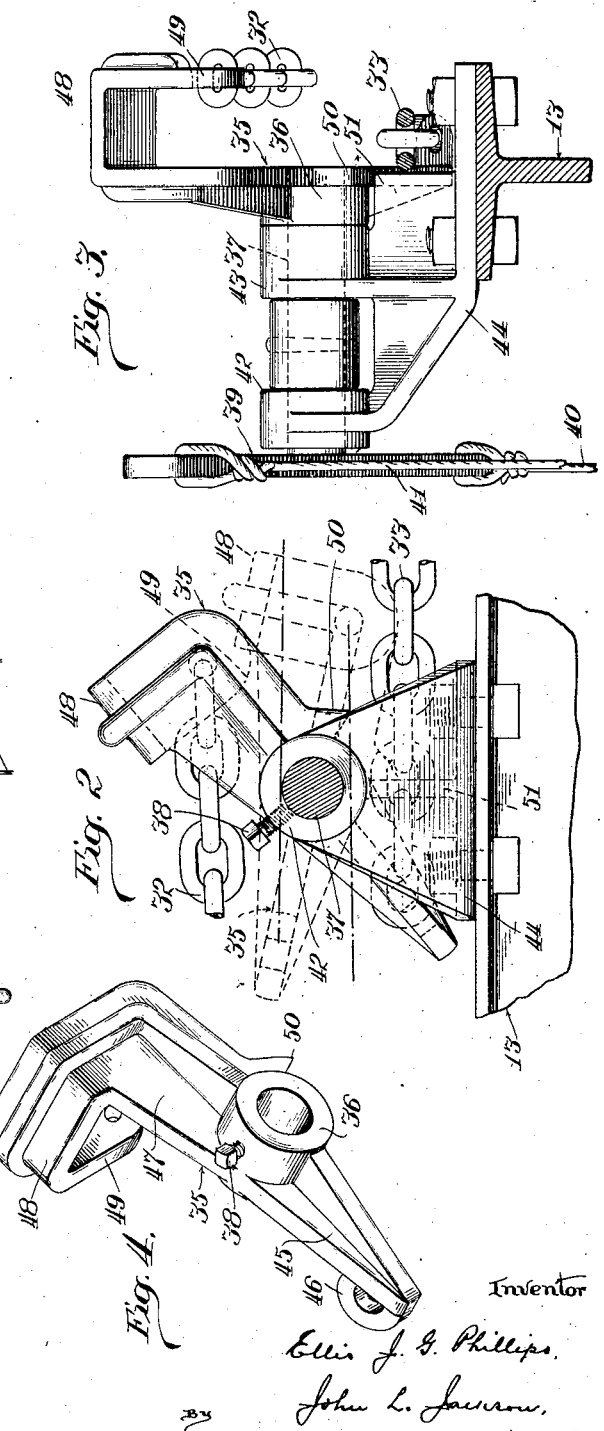

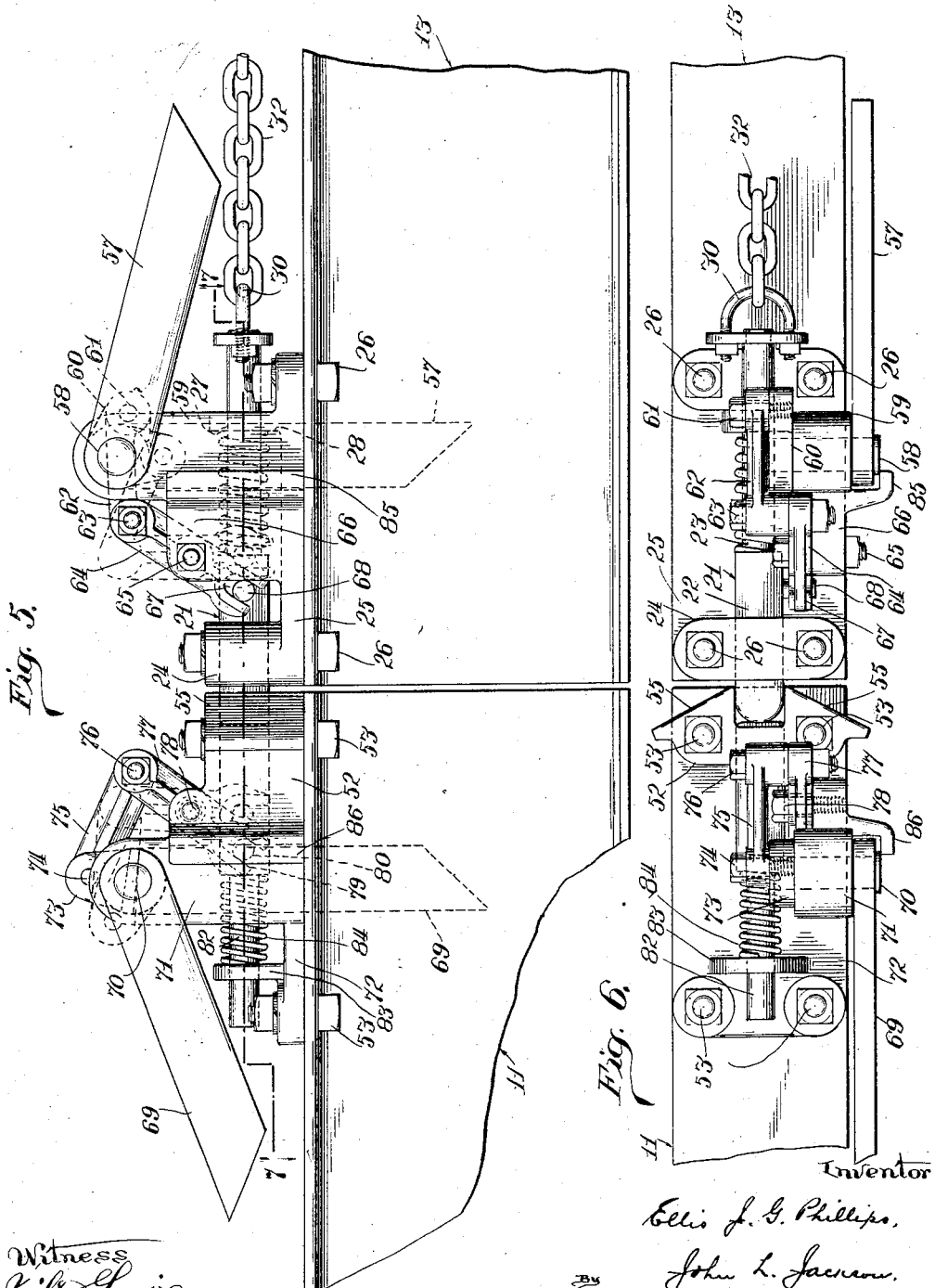

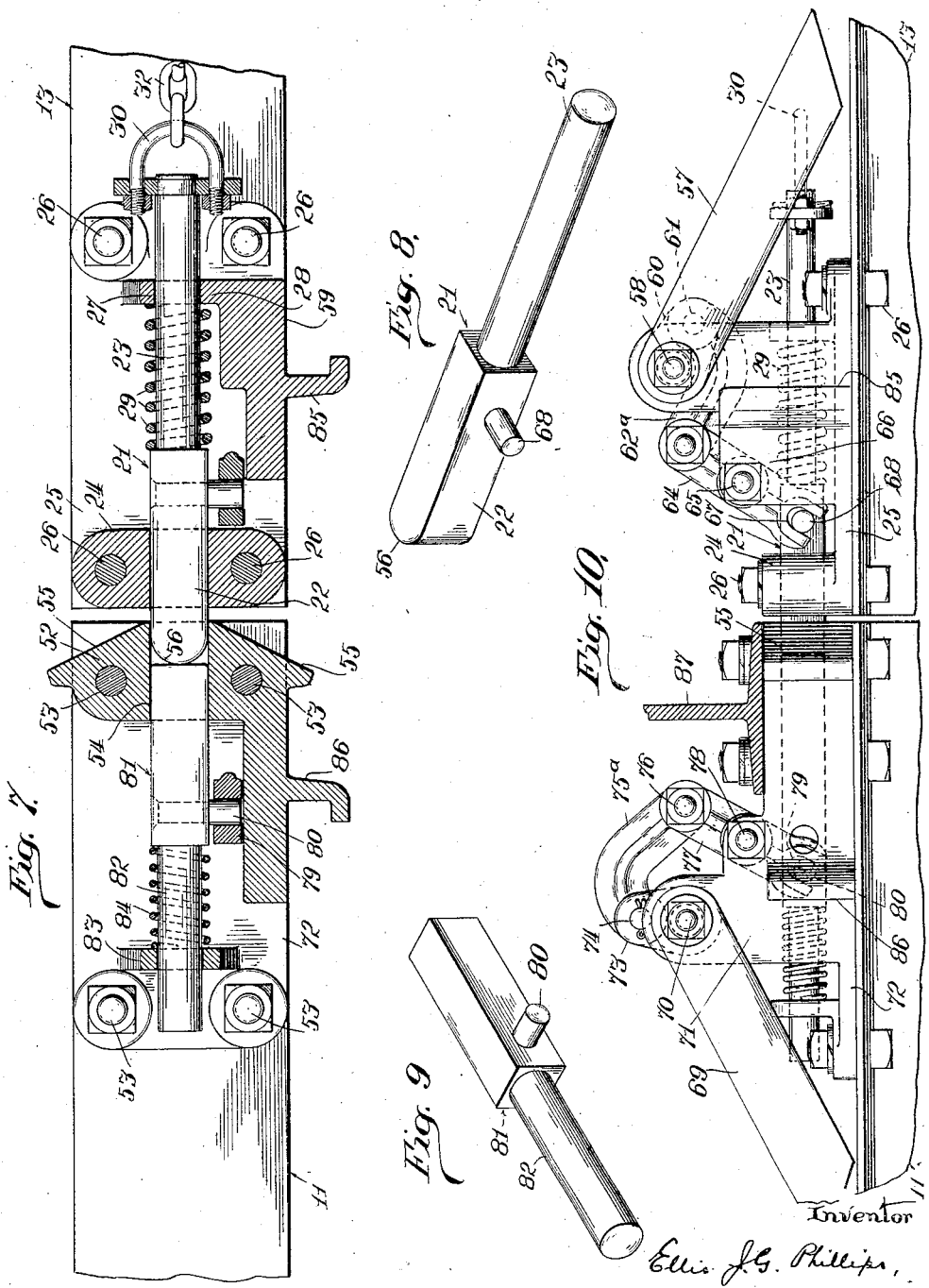

Patented Sept. 27, 1927.

1,643,642

UNITED STATES PATENT OFFICE.

ELLIS J. G. PHILLIPS, OF AURORA, ILLINOIS, ASSIGNOR TO RICHARDS-WILCOX MANUFACTURING COMPANY, OF AURORA, ILLINOIS, A CORPORATION OF ILLINOIS.

TRAVELING CRANE.

Application filed February 7, 1925. Serial No. 7,615.

My invention relates to traveling cranes of the type comprising a movable track section adapted to be translated on a suitable track from its initial position where it registers at its ends with stationary track sections, so that a load carried by a trolley adapted to run on such track sections may be transferred from one of the stationary track sections to the movable track section of the crane and be transported by it to some other point. With apparatus of this kind it it obviously desirable that means be provided for locking the movable track section to the stationary track section, or sections, when it is in alinement therewith, so that the trolley with its load can be safely transferred from one to the other, and also that provision be made for blocking said track sections when they are not in alinement with each other to prevent trolleys from accidentally running off of them, and to provide improved means for accomplishing these results is the object of my present invention. I accomplish this object as illustrated in the drawings and as hereinafter described. What I regard as new is set forth in the claims.

In the accompanying drawings,—

Fig. 1 is a side elevation of a crane embodying my improvements, the tracks on which the movable member of the crane travels being shown in section;

Fig. 2 is an enlarged side elevation of a manually operated device for unlocking the traveling section of the crane, the pivot thereof being shown in section;

Fig. 3 is an end view of the parts shown in Fig. 2;

Fig. 4 is a perspective view of one of the parts shown in Figs. 2 and 3;

Fig. 5 is an enlarged partial side elevation illustrating the construction of the locking devices and the safety stops by which the track sections are automatically blocked when the traveling section is unlocked;

Fig. 6 is a plan view of the parts shown in Fig. 5;

Fig. 7 is a section on line 7—7 of Fig. 5;

Fig. 8 is a perspective view of one of the locking bolts;

Fig. 9 is a perspective view of one of the thrust blocks that cooperate with said bolts to control the position of the safety stops associated with the stationary track sections; and Fig. 10 is a view similar to Fig. 5, showing a modified arrangement.

In cranes of this type the tracks are usually of I-beam type, and the trolleys are U-shaped, that is to say, they comprise a U-shaped frame with one or more rollers mounted on each arm thereof, the rollers being arranged to run on the lower flanges of the I-beam at opposite sides of the web thereof. In the drawings I have shown a crane of this type comprising stationary track sections 11, 12 and an intermediate traveling or movable track section 13 which is adapted to be moved into position to register with the stationary track sections, or to be moved away therefrom to some other point, where it may or may not aline with another pair of similar stationary track sections, depending on the requirements of the plant where it is installed. In the construction shown the movable track section 13 is supported by and is arranged to travel on overhead tracks 14, 15 adjacent to its ends, being movably supported thereby by means of pairs of rollers 16, 17 mounted on brackets 18, 19 secured to the upper marginal portion of the track section 13 in any suitable way. As shown in Fig. 1, the rollers 16, 17 run on the lower flanges of the tracks 14, 15, and as said tracks are disposed at right angles to the stationary track sections 11, 12, the movable track section 13 is capable of being moved into and out of alinement with said track sections 11, 12. A trolley such as is intended for use on tracks of this kind is shown at 20 in Fig. 1.

For locking the movable track section 13 in operative relation to the stationary track sections 11, 12, locking devices are provided at both ends of said movable track section, said locking devices comprising bolts 21 mounted to slide longitudinally thereof, so that when projected they will extend beyond the ends of said track section, as shown in Fig. 7. Each of said bolts comprises a head 22 and a shank 23, the head being fitted to slide through a guide block 24 carried by a plate 25 that is fixedly secured to the upper surface of the track section 13, as by bolts 26 shown in Figs. 5 and 7. The shank 23 of each bolt extends through a bearing 27 provided in a vertical flange 28 that rises from the base plate 25. A spring 29 is fitted on the shank 23 between the head 22 and the flange 28, and consequently tends to thrust the head 22 out beyond the adjacent end of the track section 13. The two bolts 21 at opposite ends of the track section 13 are oppositely disposed, and it will be understood that the springs 29 act to move them in opposite directions, or, in other words, tend to thrust the bolts outward beyond the ends of said track section. The inner ends of said bolts are provided with swivels 30, 31, to which are connected chains 32, 33, respectively, as best shown in Figs. 1 and 7. These chains extend longitudinally at the upper side of the track section 13, the chain 32 preferably passing under a guide roller 34 which holds it down close to the upper margin of the track section, and the inner ends of said chains are connected to the opposite end portions of a cross-head 35, best shown in Figs. 2, 3 and 4. Said cross-head is provided with an intermediately disposed boss 36 bored to receive a shaft 37 on which it is mounted and to which it is clamped preferably by a set screw 38. The shaft 37 extends transversely of the track section 13, and it carries a lever 39 mounted thereon between its ends and keyed thereto in any suitable way. Cables or rods 40, 41, connected with the end portions of said lever, hang down to within reach of the operator, who by pulling on one or the other of said cables may rock the shaft 37, thereby rocking the cross-head 35. As best shown in Fig. 3, the shaft 37 is mounted in suitable bearings 42, 43 carried by a bracket 44 that is secured to the track section 13, and the cross-head 35 is mounted on said shaft adjacent to the bearing 43, while the lever 39 is mounted on the opposite end of said shaft adjacent to the bearing 42. The lower arm 45 of said cross-head is practically straight, as shown in Figs. 2 and 4, but it is provided with a laterally projecting lug 46 to which the chain 33 is connected. The opposite or upper arm 47 of said cross-head is stirrup shaped, as shown at 48 in Figs. 3 and 4, it being provided with an offset flange 49 to which the chain 32 is connected. The purpose of this arrangement is to hold the inner ends of said chains out of alinement with each other and permit them to pass each other in the operation of unlocking the bolts 21, as indicated by dotted lines in Fig. 2. Preferably the cross-head 35 is provided with a lug 50, best shown in Fig. 4, which is adapted to engage a flange 51 on the bracket 44 when said cross-head has been moved far enough to unlock both bolts, and thereby prevent further movement in that same direction of said cross-head. From the foregoing it will be seen that by pulling down on the cable 41 both bolts 21 may be drawn back against the tension of the springs 29, so that they will not project beyond the ends of the track section 13, and that when said cable is released said springs will tend to restore the bolts to their operative position. This operation may be facilitated by pulling down on the cable 40 to rock the cross-head 35 in the opposite direction, and thereby pay out the chains 32, 33.

When the movable track section 13 is in alinement with the stationary track sections, the bolts 21 when projected are adapted to engage keeper blocks 52 mounted on the upper margins of the stationary track sections 11, 12, as shown in Fig. 1, and firmly secured thereto in any suitable way, as by bolts 53. Each of the keeper blocks 52 is provided with a longitudinally extending passage 54 that conforms in cross-sectional dimensions with the passage in which the bolt head 22 slides, so that when projected said bolt head is adapted to enter the passage 54 and thereby lock the movable and stationary track sections together. As best shown in Fig. 7, at each side of the passage 54 said keeper blocks are provided with inclined surfaces 55 that are adapted to be engaged by the outer end of the bolt head 22 as the movable track section approaches its locking position and force said bolt head inward sufficiently to permit the movable track section to assume such locking position. Preferably the outer ends of the bolt heads 22 are rounded, as shown at 56 in Fig. 7, to facilitate this operation. By this construction the movable track section is automatically locked to the stationary track sections when it is moved into a position of alinement therewith, since the springs 29 serve to project the bolt heads 22 into the passages 54 when the movable track section reaches its locking position.

In connection with the locking devices above described, I provide guards or stops for the end portions of the movable track section and the adjacent ends of the stationary track sections that are mounted to swing in vertical planes parallel with said track sections respectively, and are automatically moved into operative position by the unlocking of the movable track section, and also are automatically moved out of operative position by the locking thereof, as will now be described.

Mounted on each end portion of the movable track section 13 is a vertically swinging stop 57 arranged to be turned either to an approximately horizontal position above said track section, as shown in Fig. 5, or to a vertical position so that it extends down alongside of said track section, as indicated by dotted lines in said figure. Each of said stops is mounted upon a horizontal pivot 58 journaled in a standard 59 that is preferably integral with the flange 28, as shown in Fig. 7. The pivot 58 is provided with a crank 60, best shown in Fig. 6, having a wrist pin 61 with which one end of a link 62 is pivotally connected. The other end of said link is connected by a pivot 63 with one arm of a lever 64 fulcrumed between its ends on a horizontal pivot 65 carried by a support 66 that is preferably formed integral with the guide block 24, as shown in Fig. 5. The other arm of the lever 64 is forked, as shown at 67 in Fig. 5, to receive a laterally projecting pin 68 carried by the bolt head 22, as shown in Figs. 5, 6 and 8. The lever 64 rocks in a vertical plane and it will be apparent that longitudinal movement of the bolt 21 will cause said lever to rock, and consequently through the link 62 the stop 57 will also be rocked. The arrangement is such that when the bolt 21 is retracted the stop 57 will be moved down to its dotted line position shown in Fig. 5, and when said bolt is projected said stop will be moved up to the full line position shown in said figure. The spring 29 of course tends to project said bolt, and consequently to hold the stop 57 in its inoperative position, and when the bolt is retracted the stop is held in its operative position by reason of the fact that the swinging of the cross-head 35 to retract the bolts at the ends of the movable track section carries the inner end of the chain 32 down below the shaft 35, and the inner end of the chain 33 up above said shaft, as indicated by dotted lines in Fig. 2, so that the outward pull on said chains effected by the springs 29 tends to prevent reverse movement of the said cross-head and therefore holds the bolts retracted and the stops 57 in their operative position. When the stops are in such position they serve to intercept a trolley on the movable track section and prevent it from running off at either end thereof.

Stops of the same general character are provided in connection with the stationary track sections, and their operating connections are similar to those provided for the movable track section. As shown in Figs. 1 and 5, each of the stationary track sections is provided with a vertically swinging stop 69 adapted to swing down beside the track section with which it is associated to block the passage of a trolley thereon toward the movable track section. Each of said stops is mounted on a pivot 70 supported by a standard 71 rising from a base plate 72 which is secured to the stationary track section in any suitable way. Said stop is mounted on the outer end of said pivot so that it may swing down beside the track section on which it is placed. The inner end of said pivot carries a crank 73 having a wrist pin 74 with which is pivotally connected one end of a link 75; the opposite end of which is connected by a pivot 76 with a lever 77 fulcrumed between its ends on a pivot 78, as shown in Fig. 5. The opposite end of said lever is provided with a fork 79 that receives a laterally projecting pin 80 carried by a plunger head 81, similar in contour to the bolt head 22, and arranged to slide longitudinally in the passage 54, as shown in Fig. 7. Said plunger is provided with a reduced stem 82 that slides in a suitable bearing in an upwardly extending flange 83 carried by the base plate 72, and between said flange and the plunger head 81 is a spring 84 that is mounted on the stem 82 so that it is adapted to be compressed by the retraction of the plunger. The spring 84 is somewhat weaker than the spring 29, so that when the bolt head 22 is projected, through its engagement with the plunger head 81, it will thrust back said plunger against the tension of the spring 84, as illustrated in Fig. 7. When, however, the bolt head 22 is retracted, the plunger head 81 will follow it up under the action of the spring 84. The longitudinal movement of the plunger head 81, as described, will of course rock the lever 77 in one direction or the other, thereby swinging the stop 69 into or out of operative position, and it will be noted that the arrangement is such that when the plunger head 81 is retracted the stop 69 will be moved up out of its operative position, and when said plunger head is projected, or moved to the right as viewed in Fig. 7, said stop will be moved down to its operative position under the action of the spring 84. As these movements of the stop 69 are dependent on the movement of the bolt 21, it will be seen that the stop 69 automatically moves into or out of position on the unlocking or locking of the movable track section, the stops at both ends of the movable track section being similarly and simultaneously actuated. When the stops 57 and 69 are moved down to their operative position, they respectively come into engagement with laterally projecting lugs 85, 86 carried by the blocks 59 and 52, respectively, best shown in Fig. 7, which prevent them from moving beyond their vertical position and relieve the operating parts of the strain imposed by any pressure against the lower ends of said stops tending to move them beyond their proper operative position.

In Fig. 10 I have shown a slightly modified arrangement of the connections by which the stops 57 and 69 are actuated, such modification residing principally in making the links 62 and 75 curved, as shown at 62$^a$ and 75$^a$ in said figure, instead of straight as shown in the other figures. The arrangement shown in Fig. 10 also differs from that shown in the earlier figures in that the supports for the stationary track sections are placed between the stop actuating devices and the proximate ends of said track sections, as shown at 87, instead of being placed at the opposite side of said actuating devices as shown at 88 in Fig. 1. The arrangement shown in Fig. 10 makes it necessary to make the plunger head 81 and the parts on which it is mounted somewhat longer than it is shown to be in Fig. 7, but the operation of the actuating device therefor is not affected.

While I have described in detail the embodiment of my invention illustrated in the drawings, I wish it to be understood that I do not wish to be limited to the specific construction shown and described, as my invention includes such changes or modifications within the scope of the generic claims appended hereto as would occur to those familiar with the art.

What I claim as my invention and desire to secure by Letters Patent, is—

1. A trolley apparatus comprising a stationary track section, a track section movable into and out of alinement therewith, a bracket supported on said movable track section, a bolt guided by said bracket and adapted to effect locking engagement with said stationary track section, a stop pivotally supported on said bracket and swinging in a vertical plane parallel with the plane of the movable track section, means for actuating said stop with the motion of said locking bolt, and means for projecting and retracting said bolt.

2. A trolley apparatus comprising a stationary track section, a track section movable into and out of alinement therewith, a bracket supported on said movable track section, a locking bolt guided by said bracket for effecting locking engagement with said stationary track section, a stop pivotally supported on said bracket, lever means pivoted on said bracket for transmitting motion between said locking bolt and said stop, and means for projecting and retracting said bolt.

3. A trolley apparatus comprising a stationary track section, a track section movable into and out of alinement therewith, a bolt carried by said movable track section and adapted to be projected to engage said stationary track section for locking said track sections together, and a safety stop swinging in a vertical plane parallel with the plane of a movable track section and actuated by the projection or retraction of said bolt to move out of or into operative position.

4. A trolley apparatus comprising a stationary track section, a track section movable into and out of alinement therewith, a bolt carried by said movable track section and adapted to be projected to engage said stationary track section for locking said track sections together, a safety stop carried by said movable track section and a lever operatively connected with said bolt and with said safety stop for actuating said stop with the movement of said bolt.

5. A trolley apparatus comprising a stationary track section, a track section movable into and out of alinement therewith, a bolt carried by said movable track section, and adapted to be projected to engage said stationary track section for locking said track sections together, a safety stop associated with one of said track sections, and means comprising a lever and a link connected thereto for transmitting motion from said locking bolt to said safety stop.

6. A trolley apparatus comprising a stationary track section, a track section movable into and out of alinement therewith, a bolt carried by said movable track section and adapted to be projected to engage said stationary track section for locking said track sections together, a safety stop associated with one of said track sections, a lever pivotally supported on said movable track section, means for imparting movement from said locking bolt to one end of said lever, and a link pivotally connecting the other end of said lever to the safety stop.

7. A trolley apparatus comprising a stationary track section, a track section movable into and out of alinement therewith, a bolt carried by one of said track sections and adapted to be projected to engage the other track section for locking said track sections together, a safety stop moved into operative position by the retraction of said bolt, means for guiding said bolt, said bolt comprising an extending shank portion, a spring confined on said shank portion for moving said bolt in one direction, and means for moving said bolt in the other direction.

8. A trolley apparatus comprising a stationary shank section, a track section movable into and out of alinement therewith, a bolt carried by said movable track section and adapted to be projected to engage said stationary track section for locking said track sections together, a lever pivotally supported on said movable track section, a spring normally tending to move said bolt in one direction, and linkage means connecting directly between said lever and said bolt.

9. A trolley apparatus comprising stationary track sections, a track section movable into and out of alinement therewith, bolts carried by said movable track section and adapted to be projected beyond the ends thereof for effecting locking engagement with said stationary track sections, a lever pivotally mounted on said movable track section, and bolt operating means extending between said lever and each of said bolts, said bolt operating means having offset pivotal connections with said lever to permit said lever to be rotated sufficiently to carry said offset pivotal connections over center.

10. A trolley apparatus comprising stationary track sections, a movable track section mounted to travel horizontally into and out of alinement with said stationary track sections, bolts carried by said movable track section and adapted to be projected beyond the ends thereof, keepers carried by said stationary track sections and adapted to be engaged by said bolts, vertically swinging safety stops carried by said stationary track sections and movable into and out of operative position, springs tending to move said stops into operative position, and means actuated by the projection of said bolts for moving said stops out of operative position.

11. A trolley apparatus comprising stationary track sections, a movable track section mounted to travel horizontally into and out of alinement with said stationary track sections, bolts carried by said movable track section and adapted to be projected beyond the ends thereof, keepers carried by said stationary track sections and adapted to be engaged by said bolts, safety stops carried by said stationary track sections and movable into and out of operative position, springs tending to move said stops into operative position, means actuated by the projection of said bolts for moving said stops out of operative position, and stops carried by said movable track section and actuated by the projection or retraction of said bolts to move out of or into operative position.

12. A trolley apparatus comprising stationary track sections, a movable track section mounted to travel horizontally into and out of alinement with said stationary track sections, bolts carried by said movable track section and adapted to be projected beyond the ends thereof, keepers carried by said stationary track sections and adapted to be engaged by said bolts, swinging stops mounted on said track sections adjacent to the ends thereof, springs mounted on said stationary track sections and tending to move the stops thereon into operative position, springs mounted on the movable track section and tending to move the stops mounted thereon out of operative position, and to project said bolts, and means actuated by the projection of said bolts for moving the stops associated with said stationary track sections out of operative position.

13. A trolley apparatus comprising stationary track sections, a movable track section mounted to travel horizontally into and out of alinement with said stationary track sections, bolts carried by said movable track section and adapted to be projected beyond the ends thereof, keepers carried by said stationary track sections and adapted to be engaged by said bolts, swinging stops mounted on said track sections adjacent to the ends thereof, springs mounted on said stationary track sections and tending to move the stops thereon into operative position, springs mounted on the movable track section and tending to move the stops mounted thereon out of operative position, and to project said bolts, and plungers mounted on the stationary track sections and actuated by the projection of said bolts for moving the stops associated with said stationary track sections out of operative position.

14. A trolley apparatus comprising stationary track sections, a track section mounted to move horizontally into and out of alinement therewith, bolts carried by said movable track section and adapted to be projected beyond the ends thereof, keepers carried by said stationary track sections adapted to be engaged by said bolts, springs for projecting said bolts, and means carried by said movable track section for controlling the position of said bolts, comprising a cross-head pivoted between its ends, said cross-head having a laterally offset portion at one end, chains connected respectively with said bolts, one of said chains being connected with the offset portion of said cross-head and the other chain being connected with the other end portion of said cross-head, and means for rocking said cross-head in either direction.

15. A trolley apparatus comprising a stationary track section, a track section movable into and out of alinement therewith, means for locking said track sections in operative relation to each other, and a safety stop mounted to swing in a vertical plane parallel with the plane of one of said track sections into or out of operative position, said safety stop being actuated by said locking means to move into operative position when said track sections are unlocked, and to move into inoperative position when said track sections are locked together.

16. A trolley apparatus comprising a stationary track section, a track section movable into and out of alinement therewith, means carried by said movable track section for locking said track sections in operative relation to each other, and a safety stop mounted on said movable track section to swing in a vertical plane parallel with the plane of the latter track section into or out of operative position, said stop being movable out of operative position by the locking of said track sections together.

17. A trolley apparatus comprising a stationary track section, a track section movable into and out of alinement therewith, locking means carried by one of said track sections and operable to lock said track sections in alinement with each other, and safety stops mounted on said track sections to swing in vertical planes parallel with the planes of the track sections on which they are mounted into and out of operative position, said stops being movable out of operative position by the locking of said track sections together.

18. A trolley apparatus comprising a stationary track section, a track section movable into and out of alinement therewith.

locking means carried by one of said track sections and operable to lock said track sections in alinement with each other, and safety stops mounted on said track sections to swing in vertical planes parallel with the planes of the track sections on which they are mounted into and out of operative position, said stops being movable out of operative position by the locking of said track sections together, and being movable into operative position by the unlocking of said track sections.

19. A trolley apparatus comprising a stationary track section, a track section movable into and out of alinement therewith, means for locking said track sections in alinement with each other, and a safety stop associated with one of said track sections to swing in a vertical plane parallel with the plane of such track section, and actuated to move out of or into operative position upon the locking or unlocking of said track sections.

20. A trolley apparatus comprising a stationary track section, a track section movable into and out of alinement therewith, a member movable to lock or unlock said track sections, and safety stops mounted on said track sections respectively to swing in planes parallel with the planes of their respective track sections, and actuated to swing out of or into operative position upon movement of said locking member into or out of locking position.

ELLIS J. G. PHILLIPS.